Sept. 2, 1947. L. HORNBOSTEL 2,426,932
ROTARY TOOL LATHE
Filed April 10, 1944 9 Sheets-Sheet 1

Fig.1.

Inventor
LLOYD HORNBOSTEL.
by Charles H. Hills Attys.

Sept. 2, 1947.  L. HORNBOSTEL  2,426,932
ROTARY TOOL LATHE
Filed April 10, 1944  9 Sheets-Sheet 6

Inventor
LLOYD HORNBOSTEL.

Sept. 2, 1947.    L. HORNBOSTEL    2,426,932
ROTARY TOOL LATHE
Filed April 10, 1944    9 Sheets-Sheet 9

Inventor
LLOYD HORNBOSTEL.
by Charles H. Hill Attys

Patented Sept. 2, 1947

2,426,932

UNITED STATES PATENT OFFICE 2,426,932

ROTARY TOOL LATHE

Lloyd Hornbostel, Beloit, Wis., assignor to Beloit Iron Works, Beloit, Wis., a corporation of Wisconsin Application April 10, 1944, Serial No. 530,371

21 Claims. (Cl. 82—9)

This invention relates to machine tools and particularly to rotating lathes especially adapted for finish cutting the pins, heels, and cheeks of crank shafts.

The invention will hereinafter be specifically described as embodied in a crank pin turning lathe which has stanchions for clamping the main bearings of a crank shaft to fixedly secure the crank shaft in position and which has one or more rotating tool carriages each movable around the fixed crank shaft to carry and guide a cutting tool for cutting each pin of the crank shaft to finished dimensions, for cutting the inside faces or cheeks of the webs between the pins and the main bearings of the crank shaft, and for cutting the heels of the webs adjacent the main bearings. These operations cannot be satisfactorily carried out on a conventional work rotating lathe because, in such lathes, it is necessary that the crank shaft rotate about the center line of the pin being machined, and a lathe with an exceptionally large diameter swing is thus required. In addition, since the crank shaft must be rotated off center in a conventional lathe, a clumsy arrangement necessitating the use of counterweights and a special steady rest is required. This clumsy arrangement and added weight frequency necessitates slow cutting speed. Special fixtures must be used for special sized crank shafts, and a number of these fixtures would be an expensive item requiring added storage space if a number of different types of crank shafts are to be machined. A long set-up time is required and, in addition, very accurate machining is impossible. The crank pin turning lathe of this invention, on the other hand, avoids all of the problems encountered with the turning of crank pins in conventional rotary work lathes by holding the crank shaft stationary and rotating the tools around the crank shaft. Machines of this invention are easily set up to accommodate crank shafts of widely varying size ranges, machine the crank pins in one-half to one-fourth the time heretofore required, and carry out the rapid machining at tolerances within .001 inch even on the largest size crank shafts.

It should be understood, however, that the principles of this invention are not limited for embodiment in the hereindescribed specific crank pin turning lathes, since they are applicable to other types of machine tools.

The crank pin turning lathes of this invention have an elongated bed providing a track for a carriage. The carriage, in turn, provides a track for a main ring housing which is shiftable on the carriage transversely of the bed. The bed also provides tracks for crank shaft supporting stanchions and stands to secure the crank shaft in fixed relation through the center of the ring housing. A main ring is rotatable in the housing and carries one or more tool carriages which are slidable on gibs or ways provided on a face of the main ring and feed screws move the carriages toward and away from the center of the ring. This structure permits the ring housing to be moved with the main carriage in axial directions on the bed of the machine for advancing the tool carriages and tools longitudinally of the fixedly held crank shaft. It also permits the main ring housing to move transversely of the bed of the machine on the main carriage to position the tools to travel about the proper centers desired for the turning operation. The depth of cut is controlled by movement of the tool carriages on the main ring.

A feature of the invention is the provision of a readily removable main ring bearing which has thrust bearing relationship with the ring for the full 360° of rotation of the ring and which has radial bearing relationship with the ring along two spaced arcuate portions at the bottom of the housing. The ring is radially spaced from the bearing at all points except at the two spaced arcuate portions of the bearing.

A further feature of the invention is the maintenance of an oil seal between the main bearing and the ring which it supports by utilizing the thrust faces of the bearing to confine the oil.

A still further feature of the invention deals with the feeding of lubricant to the main bearing. According to the invention, lubricant is fed into a wedge-like gap and is actually drawn onto the radial bearing surfaces by the rotating ring.

A still further feature of the invention is the provision of adjustable thrust clearance devices for the main bearing.

Still another feature of the invention is the provision of oil seals and oil grooves in the bearing housing which, due to normal rotation of the main ring, fling oil away from the opening between the main ring and housing, thereby effectively returning the oil to the interior of the housing and preventing leakage.

Another feature of the invention is the provision of non-clogging carriage supports for the tool carriages.

It is, then, an object of the invention to provide a machine tool having a tool-carrying ring receiving the work therethrough and mounted for rotation as well as movement in longitudinal and transverse directions for accurately guiding and driving cutting tools so as to maintain tolerances as low as .001 inch.

Another object of the invention is to provide a crank pin turning lathe of improved design for maintaining accuracies in the finishing of crank shaft pins, cheeks and heels which have not heretofore been achieved.

A further object of the invention is to provide an improved bearing construction for the main ring of a crank pin turning lathe.

Another object of the invention is to provide an improved lubricating system for the main bearing of a crank pin turning lathe.

Still another object of the invention is to provide tracks or ways for tool carriages on the main ring of a crank pin turning lathe which are self-cleaning and cannot become clogged by chips or turning.

Other objects and features of the invention will become apparent to those skilled in the art from the following detailed description of the annexed sheets of drawings which, by way of preferred example only, illustrate one specific embodiment of the invention.

On the drawings:

Figure 4-A is a fragmentary cross-sectional view taken along the line IV-A—IV-A of Figure 4.

Figure 10 is a longitudinal cross-sectional view, with parts in side elevation, taken along the line X—X of Figure 8.

Figure 11 is an end elevational view of the pin and strip of Figure 10.

Figure 12 is an enlarged vertical cross-sectional view, with parts in elevation, taken along the line XII—XII of Figure 7.

Figure 13 is an isometric view of a wedge block shown in Figures 7 and 12.

As shown on the drawings:

The machine in general

Figure 1:
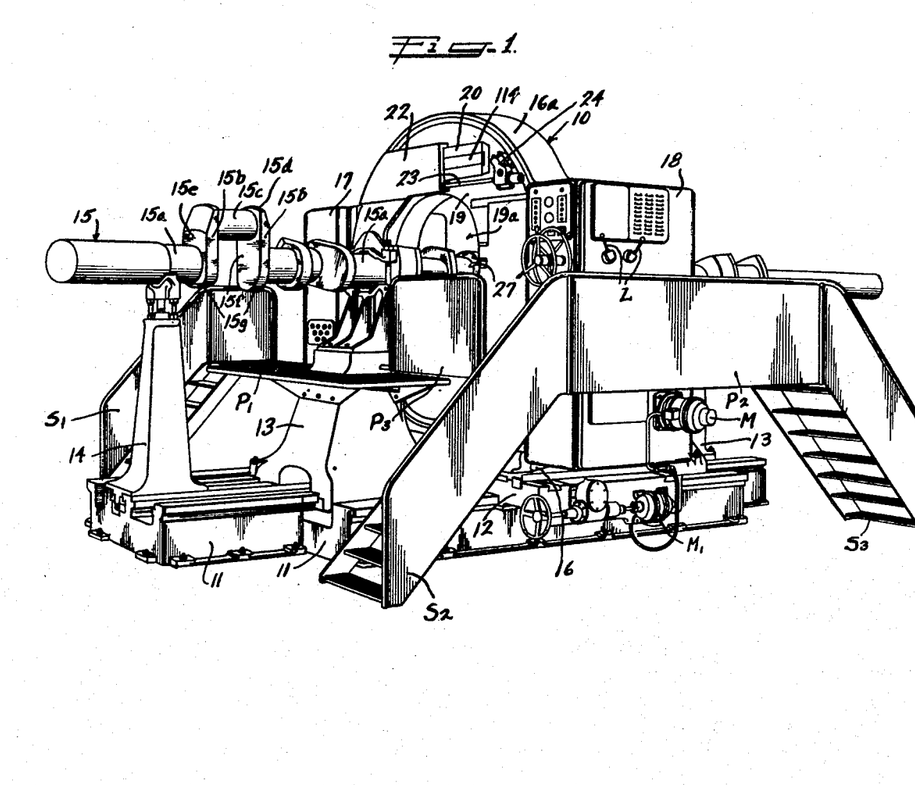
Figure 1 is a perspective view of a crank pin turning lathe according to this invention.

As shown in Figure 1, the crank pin turning lathe 10 of this invention includes an elongated bed 11 providing longitudinal tracks on which are slidably mounted a main carriage 12, crank shaft supporting stanchions 13, 13, and crank shaft supporting stands such as 14. A crank shaft 15 has main bearings 15a clamped by the stanchions 13 to support the crank shaft in fixed relation above the bed 11.

A main housing 16 is slidably mounted on the main carriage 12 for transverse movement across the bed 11. The main housing 16 is thus movable longitudinally and transversely relative to the bed 11.

Figure 2:
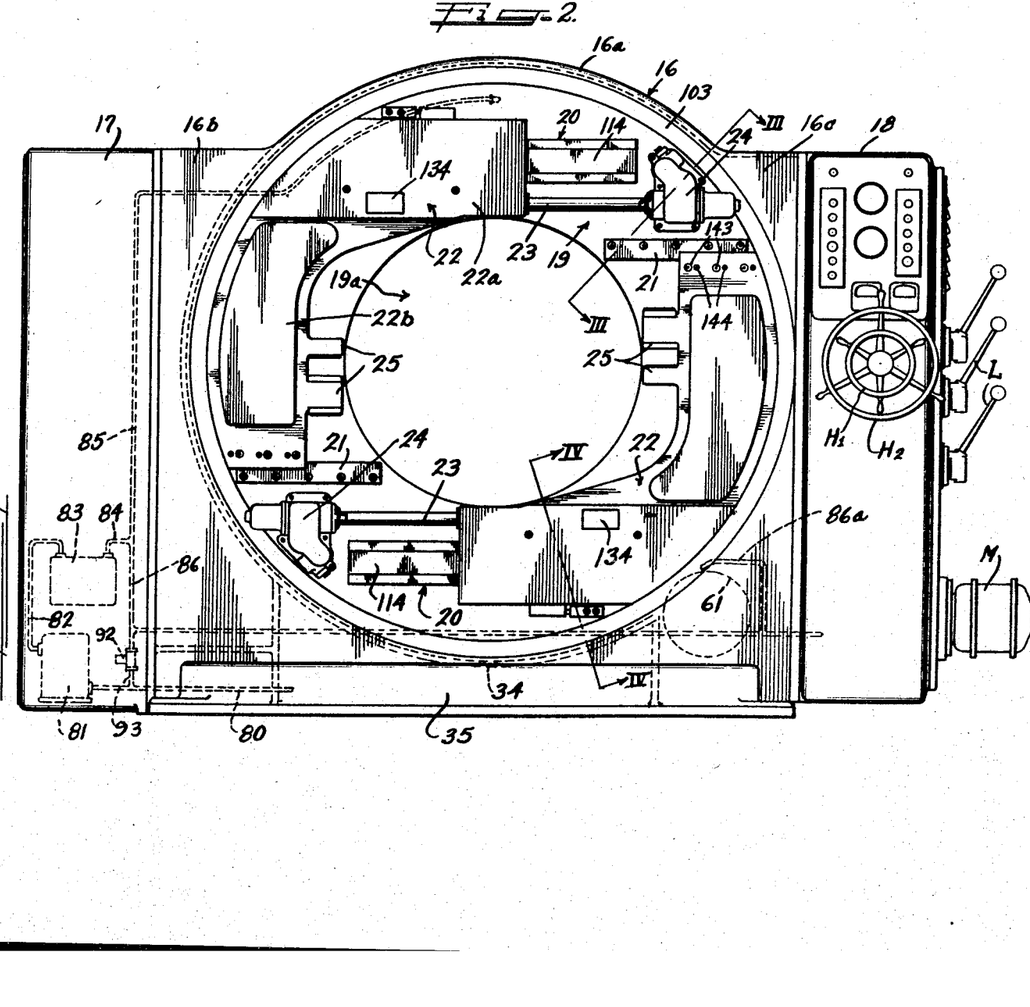
Figure 2 is a front end elevational view of the ring and ring housing of the lathe shown in Figure 1.

As shown in Figures 1 and 2, the main housing 16 has a central vertical ring portion 16a with laterally projecting portions 16b and 16c. The portion 16b has a box 17 provided on the end thereof while the portion 16c has a box 18 on the end thereof. The boxes 17 and 18 house operating parts for the machine with the box 18 containing gear drives and controls, and the box 17 containing lubricating mechanism.

As shown in Figure 1, the stanchion 13 on the front of the machine carries a platform $P_1$ and a stairway $S_1$ depends from the rear side of the platform $P_1$. The main housing 16 has a platform $P_2$ secured to the box 18 at the front side of the machine and stairways $S_2$ and $S_3$ depend from opposite ends of this platform. A platform $P_3$ bridges the platforms $P_1$ and $P_2$.

A main ring 19 is rotatably mounted in the ring housing 16a and receives the crank shaft 15 through the central aperture 19a thereof.

As best shown in Figure 2, the front end face of the main ring 19 carries parallel ways 20—20 on diametrically opposed sides thereof together with tracks 21 spaced from the ways. Tool carriages 22 are slidably mounted on the ways and tracks 20 and 21 and are fed toward and away from the center of the aperture 19a by means of feed screws 23 driven by drive gears encased in housings 24.

The gear box 18 carries a motor M which drives the main ring 19 in the ring housing 16 and also drives the feed screws 23. Gear shift levers L are provided on the box 18 for changing speed of the ring. Hand wheels H₁ and H₂ also project from the gear box 18 to control operation of the machine, such as movements of the housing 16 on the bed. A second motor M₁ (Fig. 1) is provided for moving the housing 16 on the carriage 12.

Figures 7, 8, 9:
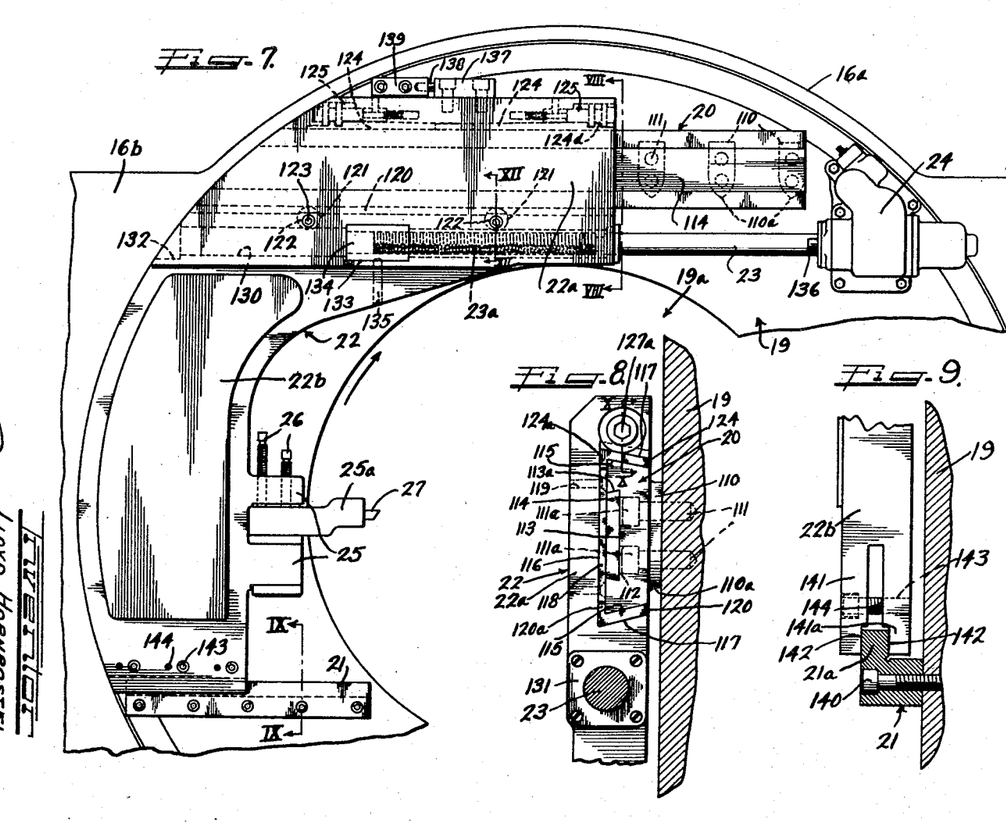
Figure 7 is a fragmentary enlarged front end elevational view of the main ring and one of the tool carriages on the main ring.
Figure 8 is a cross-sectional view, with parts in end elevation, taken along the line VIII—VIII of Figure 7.
Figure 9 is a vertical cross-sectional view, with parts in end elevation, taken along the line IX—IX of Figure 7.

The tool carriages 22, 22 have jaws 25 receiving therebetween tool holders such as 25a (Fig. 7). Set screws 26 secure the tool holders in the jaws 25a, and the tool holders carry cutting tools such as 27.

Work done by the machine

Figure 16:
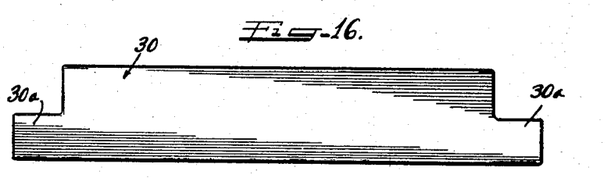
Figure 16 is a side elevational view of a forging from which a crank shaft is made.
Figure 17:
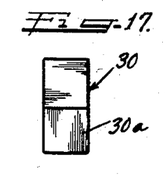
Figure 17 is an end elevational view of Figure 16.
Figures 18, 19:
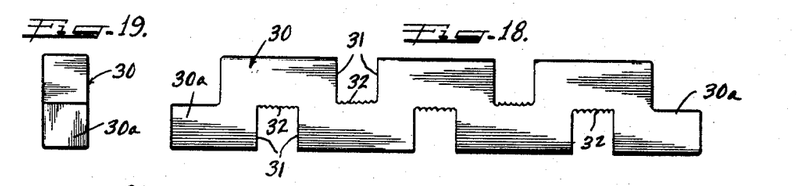
Figure 18 is a side elevational view illustrating the first cutting operation on the forging of Figure 16, to produce a crank shaft.
Figure 19 is an end elevational view of Figure 18.
Figure 20:
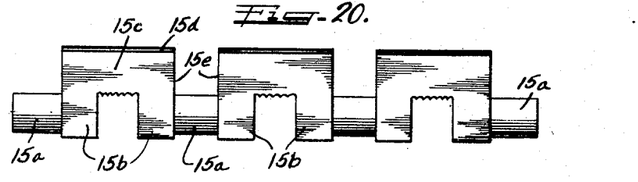
Figure 20 is a side elevational view illustrating the second operation on the forging of Figure 16, to produce a crank shaft and showing the main bearings of the shaft turned down to finished diameter.

As shown in Figures 16 and 17, an elongated metal forging or billet 30 is substantially rectangular in cross section and has reduced substantially square ends 30a. This billet 30 is the starting piece from which the crank shaft 15 is made. As indicated in Figures 18 and 19, the forging 30 has pairs of transverse cuts 31 along the length thereof at properly spaced intervals, and pieces of metal between the pairs of cuts 31 are separated from the body by torch cutting, sawing or the like, along the lines 32. The resulting blank has axially spaced segments on opposite sides of the center line thereof as shown. This blank is then placed in a rotating work lathe or conventional engine lathe and main bearings 15a for the crank shaft 15 are lathe-turned as shown in Figure 20 to provide a crank shaft blank having webs 15b all extending in one direction from the main bearings 15a and carrying at their outer ends crank pin-forming portions 15c. The outer ends of these projecting portions 15b can be rounded as at 15d by rotating the work lathe since the blank is rotated about the center of the main bearings 15a and the portions 15d can be readily cut by a stationary tool. In addition, the outside faces 15e of the webs 15b can be cut by the rotating work lathe. The crank pins 15c, the inside cheeks 15f, and the heels 15g cannot be cut by a conventional lathe without great difficulty because the work must be rotated off center for the formation of these portions.

Figure 21:
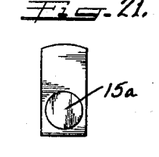
Figure 21 is an end elevational view of Figure 20.
Figure 22:
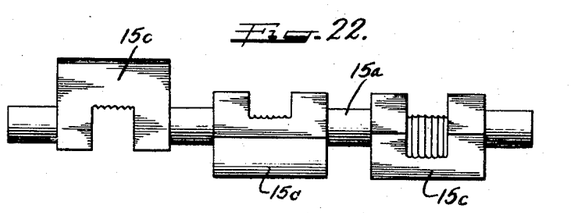
Figure 22 is a side elevational view of an unfinished crank shaft after the lathe-turned forging of Figure 20 has been twisted.
Figure 23:
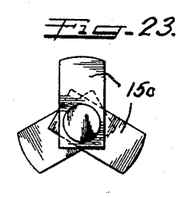
Figure 23 is an end elevational view of Figure 22.
Figure 24:
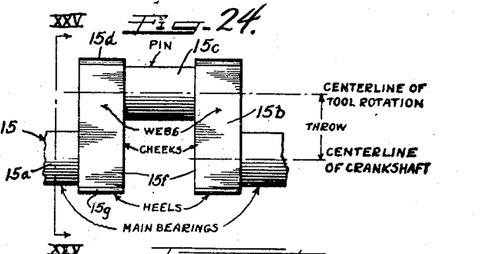
Figure 24 is a fragmentary side elevational view of a portion of a finished crank shaft made from the forgings of Figures 22 and 23 and bearing legends identifying the various parts of the crank shaft including the parts that are finished by the crank pin turning lathe of this invention.
Figure 25:
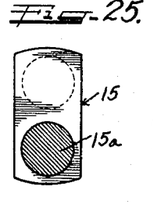
Figure 25 is a transverse cross-sectional view, taken along the line XXV—XXV of Figure 24.

Therefore the blank of Figures 20 and 21 is next twisted as shown in Figures 22 and 23 to position the crank pin-forming portions 15c at the desired angular relationship around the main bearings 15a. This provides the crank shaft blank which is acted upon by the machine 10 of this invention. As shown in Figures 1, 24 and 25, the crankshaft 15 has the pins 15c thereof, the cheeks 15f thereof, and the heels 15g thereof finish formed to tolerances never heretofore obtainable. The throw of the crank shaft is illustrated in Figure 24 together with the center line of the crank shaft and the center line of rotation of the main ring 19 of the machine.

Crank shafts have the cheeks, heels, and pins thereof finished to tolerances of even less than .001 inch in one-half to one-fourth the time heretofore required by the machine 10 of this invention, and crank shafts of tremendous size can be accommodated since they are held stationary during the pin-turning, cheek-forming, and heel-cutting operations. Tremendously large crank shafts for marine engines and stationary engines can be accommodated. Crank shafts sixty to eighty feet long and having pins two to three feet in diameter can be handled with ease.

The main ring bearing

Figure 3:
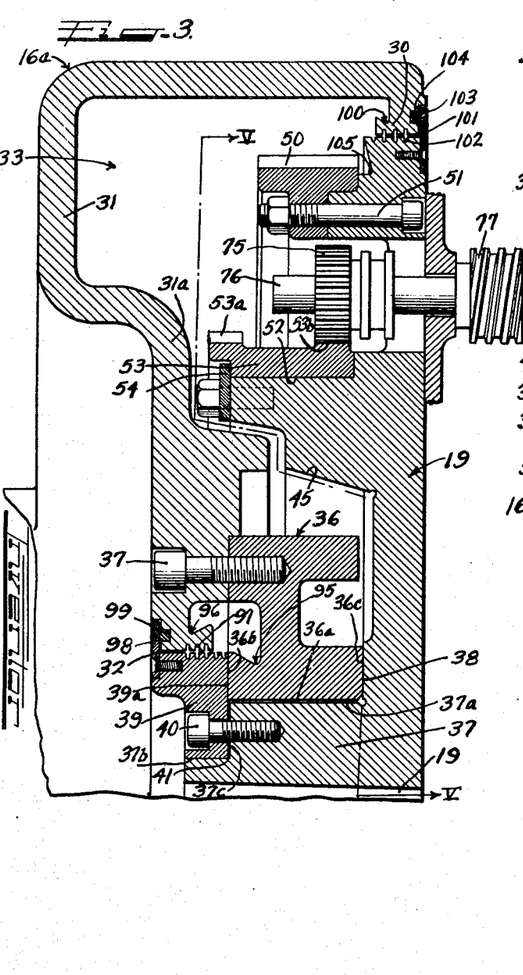
Figure 3 is an enlarged radial cross-sectional view, with parts omitted, taken along the line III—III of Figure 2.
Figure 6:
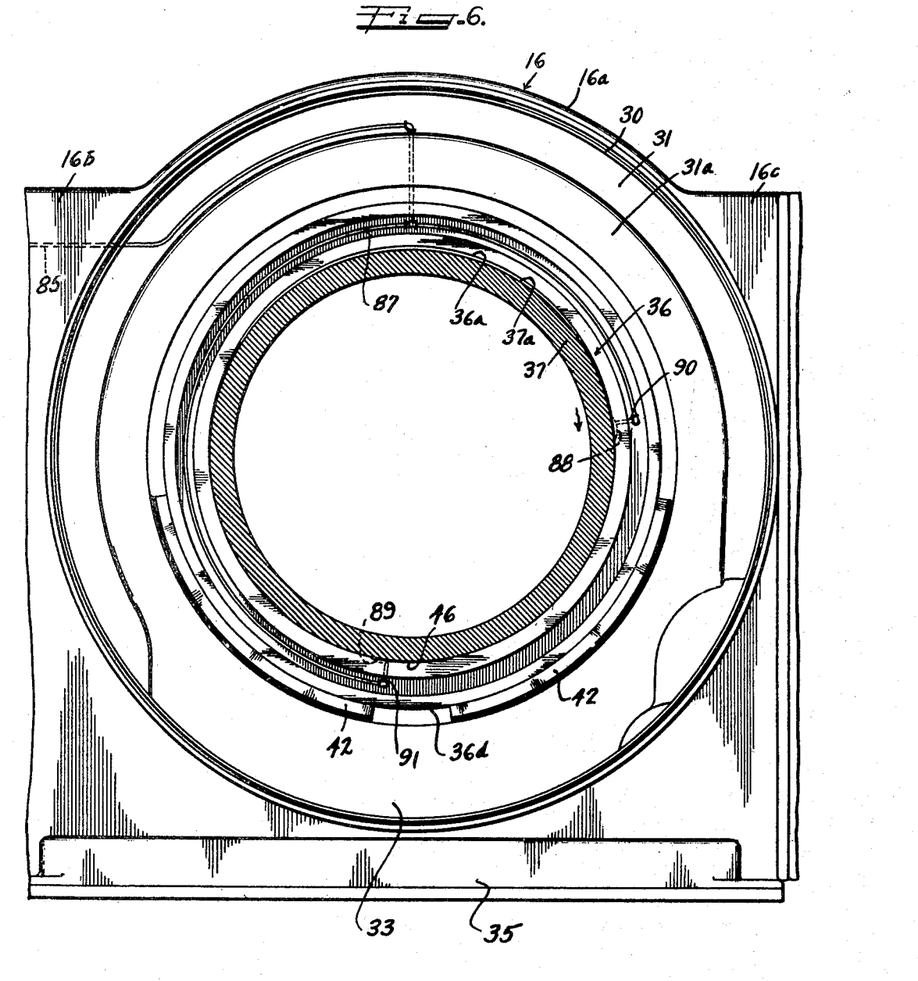
Figure 6 is a front elevational view of the ring housing with the ring removed but showing the ring hub in vertical cross section and taken along the line VI—VI of Figure 4.

As best shown in Figures 3 and 6, the ring housing 16a has an open front face bounded by a downturned lip 30 together with a closed back wall 31 having an inwardly offset portion 31a defining a central operture 32. An annular chamber 33 is thus provided as shown in Figures 3 and 4, and the bottom of this chamber communicates through a port 34 with a sump defining base 35.

A bearing ring 36 is bolted to the inwardly offset portion 31a of the back wall 31 by means of screws 37 passed through the back wall portion 31a and threaded into the ring. The bearing ring 36 projects radially inward from the wall defining the aperture 32 of the housing and has an inner annular peripheral wall 36a, a back end face 36b, and a front end face 36c. The inner peripheral wall 36a is not perfectly circular, but is formed by first cutting a straight circular cylindrical bore in the ring 36 and by then shifting the center of cutting to cut a new bore into the top portion of the old bore, thereby relieving the top of the old bore.

The main ring 19, with the aperture 19a therethrough, has a hub 37 around the aperture 19a. This hub 37 has a straight circular cylindrical peripheral portion 37a.

Figure 4:
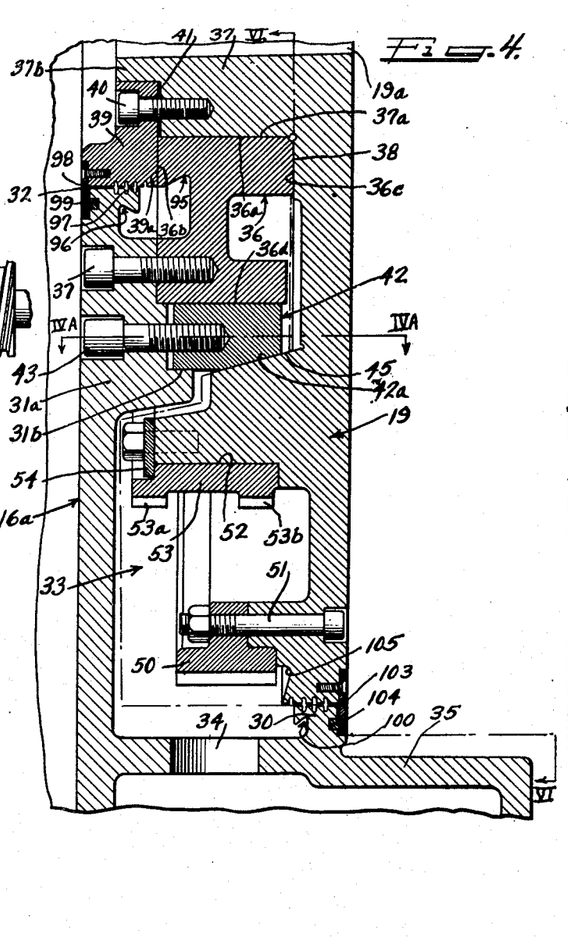
Figure 4 is an enlarged radial cross-sectional view, with parts omitted, taken along the line IV—IV of Figure 2.

As shown in Figures 3, 4 and 6, the hub 37 of the main ring 19 fits into the bearing 36 and the periphery 37a thereof is spaced from the bearing wall 36a around the top half of the bearing but is supported on the bearing wall 36a around the bottom portion of the bearing.

The main ring 19 has an annular finished wall portion 38 extending from the front end of the hub 37 thereof for thrusting on the wall 36c of the bearing as shown in Figures 3 and 4.

A ring member 39 fits around a pilot portion 37b of the hub 37 and is secured to the hub by means of bolts 40. This ring 39 has a flat inner face 39a thrusting against the face 36b of the bearing.

Shims 41 are provided between the ring 39 and a shoulder 37c at the inner end of the pilot portion 37b for controlling the distance between the faces 38 and 39a and thereby controlling the thrust bearing relationship against the faces 36b and 36c of the bearing ring 36.

Figures 4A, 10, 11, 12, 13:
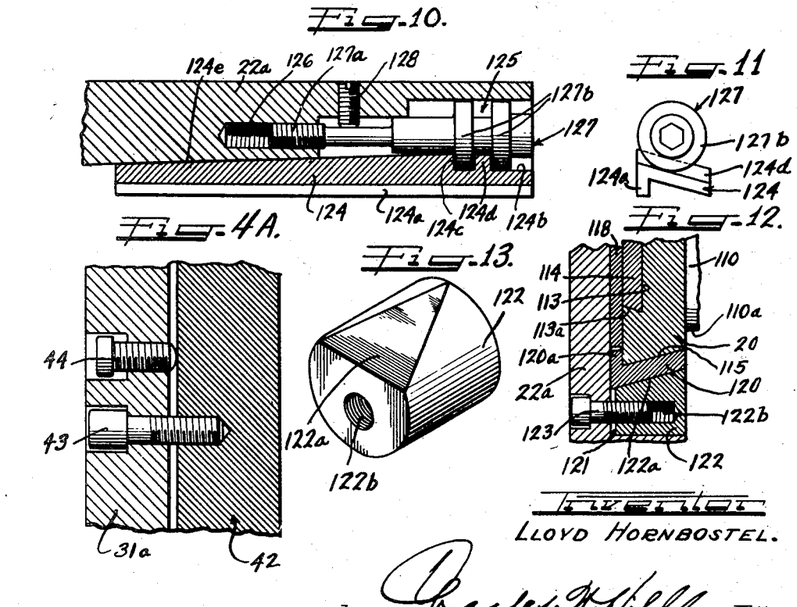

The bearing 36 has a cylindrical outer periphery 36d extending therearound and a pair of arcuate shoes 42 are disposed around the bottom part of the bearing wall periphery 36d in spaced opposed relation as shown in Figure 6. These shoes 42 are slidably mounted on a pilot portion 31b of the back wall 31a as shown in Figure 4 and have tapered outer peripheries 42a. Bolts 43 extending through the wall portion 31a are threaded into the shoes 42 to secure them to the wall 31a. As shown in Figure 4-A, bolts 44 are also threaded through the wall portion 31a adjacent the bolts 43 and have inner end portions for acting on the end wall of the shoe 42 to control the setting of the shoe. Thus the bolts 44 act as position-setters for the shoes while the bolts 43 secure the shoes against the bolts 44 on the wall 31a.

The main ring 19 has a tapered wall 45 in spaced concentric relation around the hub 37 thereof coacting with the tapered walls 42a of the shoes 42 to hold the hub periphery 37a of the ring 19 on the radial bearing wall 36a of the bearing ring 36. The shoes 42 are accurately adjustable to maintain proper bearing relationship between the bearing surfaces 36a and 37a and to hold the ring 19 down on the bottom half of the bearing 36.

As shown in Figure 6, the bottom portion of the bearing wall 36a is cut away to provide a pocket 46. Therefore, only two arcuate segments, designated at A and B respectively in Figure 14, extend from the ends of the pocket 46 around the lower portion of the hub wall 37a. The bearing segments A and B are preferably arcs of about 70°.

As shown in Figure 6, the shoes 42 are commensurate in length with the lengths of the arcs A and B.

From the above descriptions it will be understood that the main ring 19 is supported by a combined thrust and radial bearing ring 36. The bearing ring 36 provides two spaced arcuate radial bearings around the bottom half portion of the main ring and proper bearing relationship between the main ring and these bearing segments is maintained by the shoes 42 which are accurately shifted to take up clearance by means of adjusting screws 44 and locking screws 43.

Proper radial bearing relationship is maintained between the side walls 36b and 36c of the bearing ring 36 by adjusting a ring 39 on the main ring 19.

The main bearing ring 36 is readily removable from the housing 16a through the open front face of the housing.

The drive for the main ring and the tool carriages

Figure 5:
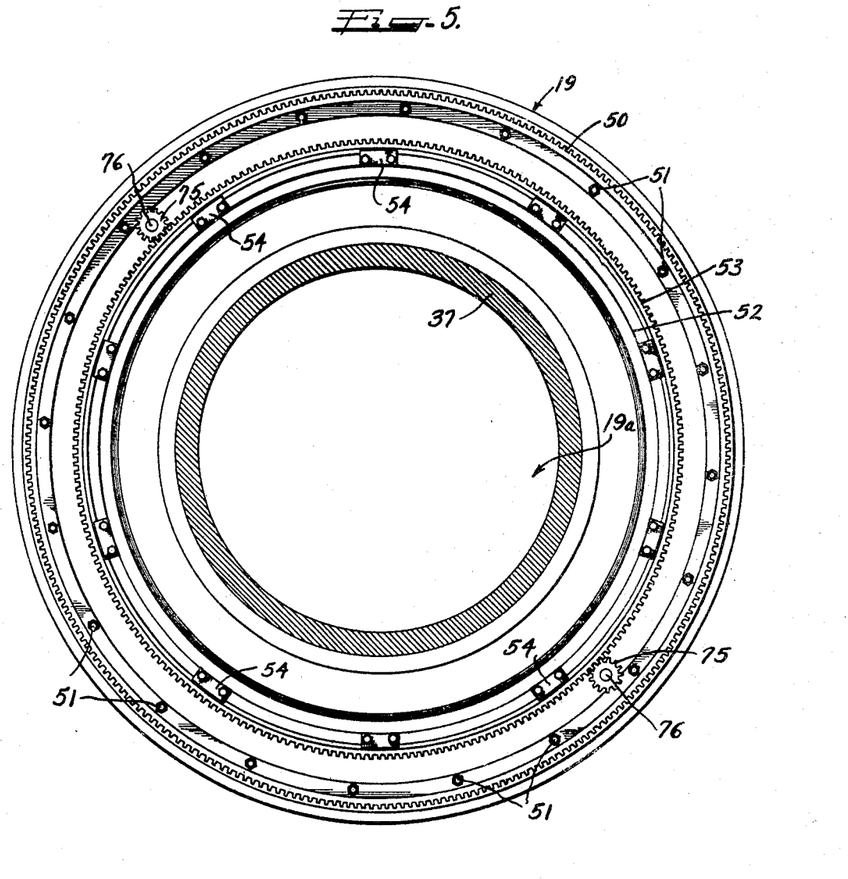
Figure 5 is a rear end elevational view of the main ring, showing the hub of the ring in vertical cross section and taken along the line V—V of Figure 3.

As shown in Figures 3, 4 and 5, a main ring gear 50 is bolted to the main ring 19 around the inner face thereof near the outer periphery by means of bolts 51. This ring gear 50 is disposed in the chamber 33 provided by the housing 16a.

The main ring 19 has a cylindrical wall or pilot portion 52 therearound inwardly of the ring gear 50 and outwardly from the tapered wall 45 thereof. A second ring gear 53 is rotatably mounted on this pilot portion 52 and held thereon by means of plates 54 bolted at spaced intervals to the inner face of the main ring 19. The ring gear 53 has a double row of teeth 53a and 53b therearound.

Figure 15:
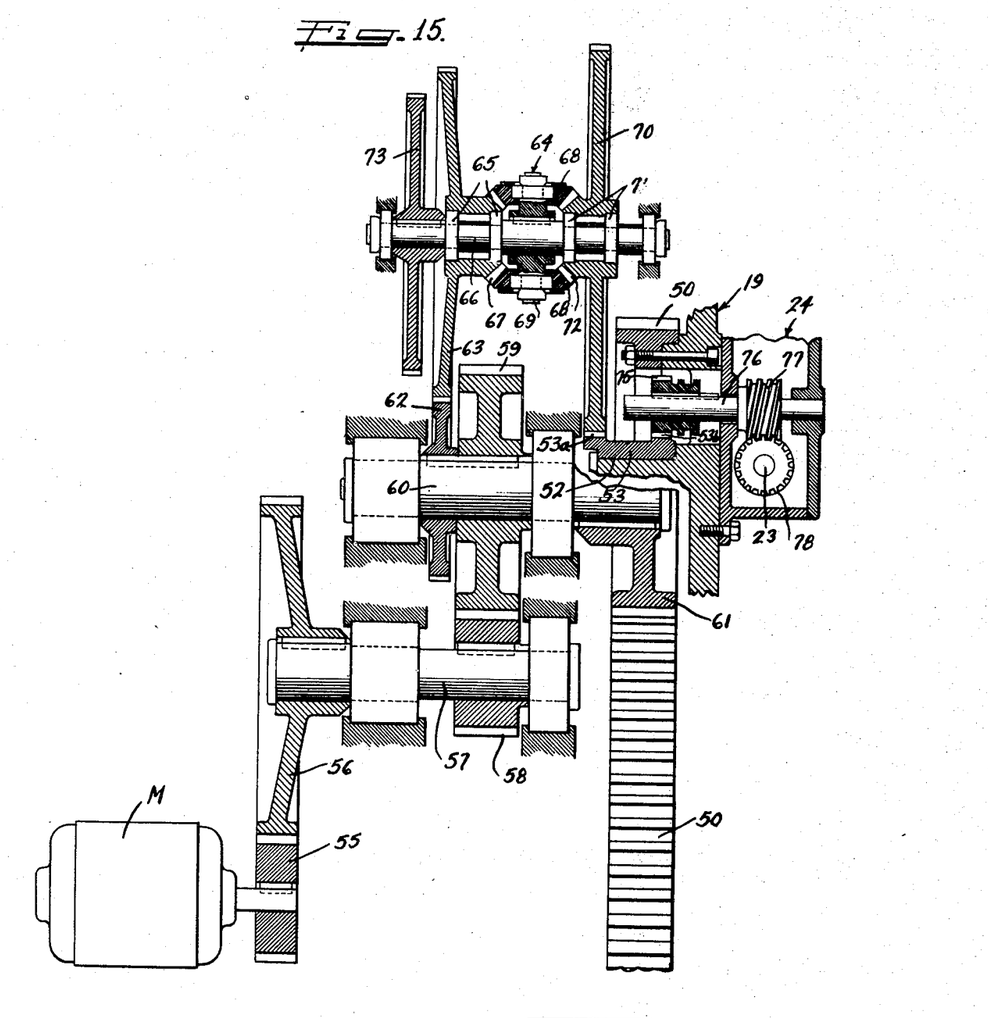
Figure 15 is a somewhat diagrammatic view of the drive for the main ring and one of the tool carriages.

As shown in Figure 15, the motor M drives a pinion 55 which, in turn, drives a gear 56 for rotating a shaft 57. The shaft 57 drives a pinion 58 rotating a gear 59 on a second shaft 60 and this shaft 60 has a main drive gear 61 meshing with the main ring gear 50 to rotate the main ring 19.

A second gear 62 keyed on the shaft 60 drives a gear 63 of a differential unit 64.

The gear 63 is freely mounted on bearings 65 around the differential shaft 66 and has bevel gear teeth 67 around the hub thereof meshed with spur gears 68 on a spider 69 keyed to the differential shaft 66.

A second gear 70 is freely rotatable around the differential shaft 66 on bearings 71 and has bevel teeth 72 on the hub thereof also meshing with the spur gears 68. This second gear 70 engages the row of teeth 53a of the ring gear 53. A gear 73 is keyed on the shaft 66 and this gear is connected to change-speed transmission mechanism and reversing feed clutch mechanism so as to drive the shaft 66 in a direction and at a speed predetermined by setting of the transmission and clutch. Whenever the shaft 66 has relative movement to the gear 63, the differential unit 64 will be operated to actuate the gear 70 and drive the ring gear 53 around its pilot support 52. The row of teeth 53b on the ring gear 53 mesh with spur gears 75 keyed to shafts 76 projecting through the front face of the ring 19 into the housings 24. Worms 77 are provided on the shafts 76 meshing with worm wheels 78 on the feed screws 23 for the carriages 22.

From the above descriptions it should be understood that the motor M drives the ring gear 50 for rotating the main ring 19, and also drives a gear 63 of a differential assembly 64 including a differential shaft 66 having a gear 73 keyed thereon for causing rotation of a gear 70 driving the sliding ring gear 53. The gear 63 is connected through a speed changer and reversible clutch system of gears back to the gear 73 so that the ring gear 53 is driven only when the gear 73 rotates at a different rate or in a different direction from the gear 63. The single motor thus drives the main ring 19 about its own axis, and drives the feed screws to actuate the tool carriages in radially inward and outward directions.

The main ring lubrication system

As shown in Figures 2, 4, 6 and 14, the oil sump 35 provided beneath the housing chamber 33 receives lubricant through the port 34 and thus provides a lubricant reservoir, from which oil is drawn through a pipe 80 into a pump 81 and pumped thereby through a pipe 82 into and through a filter 83 through a pipe line 84 connected with pipes 85 and 86. As shown in Figure 2, the pump and filter are located in the box portion 17 of the main housing 16.

Figure 14:
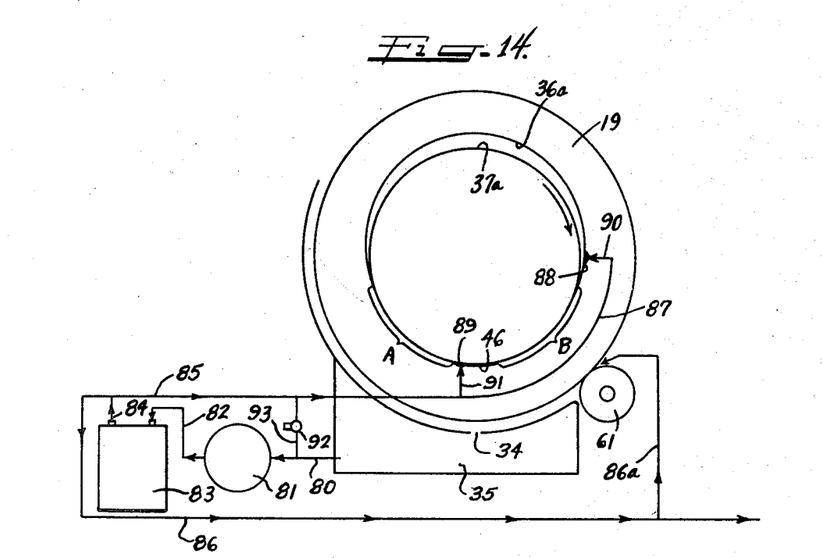
Figure 14 is a piping diagram of the lubricating system for the main bearing and gear box.

The pipe line 85 extends upwardly through the box 17 and thence into the chamber of the ring housing 16a where it is connected to an arcuate pipe 87 surrounding the bearing 36 in the space between the outer periphery of this bearing and the tapered wall 45 of the main ring 19. A sump 88 is formed on the inner face 36a of the bearing 36 at the point where the hub 37 of the main ring comes in contact with the bearing wall 36a on the descending side of the hub. This sump thus communicates with a closing wedge between the walls 36a and 37a.

As explained hereinabove, a relieved portion 46 is provided at the bottom of the bearing 36 so that the hub wall 37a of the main ring rides on two arcuate segments A and B. A sump 89 is provided in this cutaway portion 46 immediately adjacent the bottom of the bearing segment A.

A pipe 90 connects one end of the pipe 87 with the sump 88 while a second pipe 91 connects the other end of the pipe 87 with the sump 89. The pump 83 supplies oil to the sumps 88 and 89 at pressures determined by a reducing valve 92 in a pipe line 93 between the pipe 86 and the feed pipe 80. The sump 88 supplies the oil into the closing wedge at the top of the bearing segment B while the sump 89 supplies oil into the bottom of the bearing segment A. Since the main ring 19 only rotates in a clockwise direction oil will actually be drawn out of the sumps by converging wedge action between the bearing surfaces 36a and 37a to form a film of oil between the bearing segments A and B and the bearing 37a.

The pipe 86 extends across the bottom of the housing 16 above the sump 35 into the box 18 where it supplies lubricant to gears (not shown) in this box. A branch pipe 86a (Figure 2) is provided on the pipe 86 in the chamber 33 of the ring housing 16a to discharge lubricant onto the gear 61 meshed with the main ring 50.

As shown in Figures 3 and 4, oil from the sumps 88 and 89 lubricates the bearing walls 36a and 37a and, being under pressure, will also flow between the thrust bearing walls 36b and 39a, and 36c and 38. Any oil which works past the thrust bearing walls 36b and 39a drains either into a trough 95 provided in the ring 36, or a trough 96 provided in the back wall 31a of the ring housing 16a around the aperture 32 in this ring housing. The oil thus flows away from the gap between the ring member 39 and the wall defining the aperture 32. The oil drains around the rings in the troughs 95 and 96 to the bottom half of the ring where it drops by gravity into the chamber 33 and through the port 34 into the sump 35. Centrifugal action tending to throw the oil upwardly causes the oil to be trapped in the grooves away from the gap between the ring member and wall of the aperture 32. To further seal this gap, the ring member and wall can be provided with a series of grooves 97 acting as traps for the oil.

A plate 98 is carried by the ring member 39 to overlap the back wall 31a of the housing and to ride on a seal ring 99 carried in this back wall for sealing the gap.

The lip member 30 of the housing also has a trough 100 formed therearound to drain oil to the bottom of the chamber 33. The gap 101 between the lip 30 and the ring 19 communicates with a series of annular grooves 102 in the lip and ring to form traps for any oil entering the gap. A plate 103 is secured on the ring 19 to project over the front face of the housing and rub on a seal ring 104. Seal rings 99 and 104 can be composed of felt or the like sealing material.

Any oil discharged from the gear 50 can be collected in a groove 105 provided adjacent the gear, and this groove diverges away from the gap 101 so that oil will be thrown inwardly away from the inner end of the gap 101.

From the above descriptions it will be understood that oil is pumped from a sump in the bottom of the ring housing to the gear box and to the main ring bearing, where it communicates with the main ring for being drawn by wedge action out of sumps to lubricate both the radial bearing and the thrust bearing of the main bearing ring. Oil flowing past the bearing surfaces and the gears is collected in annular troughs provided in the bearing ring and around the aperture in the rear face of the ring housing and the lip on the front face of the ring housing to flow around these troughs to the bottom of the housing and back to the oil reservoir in a sump at the bottom of the housing. Seals between the rotating ring part and the front and rear walls of the ring housing are provided and the contour of the ring and housing adjacent the seals is such as to throw the oil away from the gaps between the rotating rings and housing.

*The tool carriage assembly*

In order to maintain accuracy in the lathe-cutting operation of the machine, it is not only necessary that the main rotating ring 19 be rotated about an exact center point, but it is also necessary that the tool carriages on this main ring be accurately mounted for true radial feed movement.

Accurate mounting of the tool carriages 22, 22 is obtained according to this invention by utilizing L-shaped carriages and mounting the base leg of the L throughout its entire length on the way or gib secured on but spaced from the front face of the main ring, and by mounting the head end of the main leg of the L on a guide track in straddling relationship therewith.

The carriages 22, 22 and their supporting and actuating structures are identical, so that only one carriage and its supporting and actuating structure need be described.

As shown in Figures 7, 8 and 12, the way 20 has integral pads or pontoons 110 projecting from the rear face thereof. These pontoons or pads are in spaced opposed relation along the length of the way and fit against the front face of the ring 19. They have rounded inner ends 110a converging to points. As best shown in Figure 8, the pontoons hold the way 20 in spaced relation outwardly from the front face of the ring 19 and any cutting chips or turnings can readily fall through this space and will not rest on the rounded inner ends 110a of the pontoons.

Bolts 111 extending through the pontoons 110 are threaded into the ring 19 for securing the way in position, and these bolts have heads 111a seated in countersunk portions 112 of the way so as to be beneath the face of the way.

The face of the way has a slot 113 along the length thereof with undercut side walls 113a and a cover plate 114 fits in this slot and has outwardly tapered side walls dovetailing with the side walls 113a so that the plate is secured in position. The plate 114 as an outer face flush with the outer face of the way, and the screw heads 111a are thus covered and no recesses or other chip-retaining receptacles are provided.

As best shown in Figures 8 and 12, the way 20 has tapered side walls 115 so that the outer face of the way is wider than the face thereof adjacent the ring 19. The base leg 22a of the carriage 22 has a dove-tailed groove 116 along the length thereof receiving the way 20. This groove 116 has side walls 117 parallel with the walls 115 of the way but spaced from these side walls. The groove 116 likewise has a base or inner wall spaced from the front face and cover plate 114 of the way. A wear plate 118 is bolted to the bottom face of the groove but terminates short of the end walls 117. Screws 119 are threaded into the leg 22a and have the heads thereof seated flush with the exposed face of the wear plate 118.

A bushing or liner strip 120 is positioned between that end wall 115 of the way 20 and the adjacent wall 117 of the carriage nearest to the aperture 19a of the ring. In other words the strip 120 is disposed between the way 20 and carriage leg on the radially inward end wall of the way. This strip 120 extends for the full length of the carriage leg 22a and has an upstanding flange 120a extending between the outer face of the way and the bottom of the groove 116 into spaced relation with the end of the wear plate 118.

As best shown in Figures 7, 12 and 13, the leg 22a of the carriage has two cylindrical wells 121 cut inwardly from the rear face thereof in equally spaced relation from each other and from the ends of the leg and communicating with the groove 116 at the side wall 117 thereof. A cylindrical plug 122 is disposed in each well 121. Each plug 122 has a flat tapered top face 122a engaging the bushing strip 120. The plug has an internally threaded longitudinal bore 122b receiving in threaded relation therein a screw 123 extending through the base leg 22a. As shown in Figure 12, the screw 123 acts as a means for drawing the plug 122 further into the well 121 so that the level of the bushing strip 120 can be accurately controlled and the exact position of the carriage maintained with respect to the way 20.

The radially outer end wall 115 of the way 20 receives a pair of bushing strips 124 thereon projecting inwardly from opposite ends of the carriage leg 22a and having flanges 124a depending into the space between the outer face of the way and the bottom of the groove 116 in the carriage leg. The strips 124 have their inner ends in spaced opposed relation as shown in dotted lines in Figure 7. As shown in Figure 10, the outer end portion of each strip is recessed as at 124b down to a shoulder 124c with an upstanding rib 124d in spaced relation from the shoulder 124c. The strip has a top wall 124e riding on the wall 117 of the carriage leg 22a but this top wall 124e is tapered from the shoulder 124c to the inner end of the strip.

The end portions of the leg 22a of the carriage have stepped recesses 125 therein. The stepped recesses 125 are cylindrical but communicate with the strips 124.

The legs 22a are provided with internally threaded bores 126 at the inner ends of the recesses 125.

A pin 127 is seated in each recess and has a threaded end portion 127a in screw thread relation with the bore 126 of the recess.

The pin 127 has a socket head (Fig. 11) with spaced parallel collars 127b thereon straddling the rib 124d of the strip and with one of the collars riding between the rib and the shoulder 124c.

Rotation of the pin 127 will shift it axially in the recess 125 thereby moving the strip 124 longitudinally of the carriage leg 22a and maintaining tight relationship of the carriage on the way so that no looseness will remain in the assembly. A locking screw 128 is threaded through the carriage to act on the pin for holding the same in adjusted position.

The carriage leg 22a has a straight cylindrical bore 130 therethrough inwardly from the groove 116 for freely receiving the feed screw 23 therein as shown in Figure 7. The bore 130 is materially larger than the threaded end 23a of the feed screw 23 and, to seal the bore against ingress of dirt, an end cap 131 can be bolted on the end face of the carriage slidably receiving the feed screw 23 therethrough. The other end of the bore can be closed by means of a plug 132, as shown in Figure 7.

The carriage leg 22a has a rectangular opening 133 cut therethrough transversely of the bore 130 and receiving a nut 134 therethrough with the threaded aperture of the nut in threaded engagement with the portion 23a of the feed screw in the bore. A set screw 135 is threaded into the carriage for locking the nut 134 in the slot 133. The slot or opening 133 slidably receives the nut 134 but holds the same against end movement and, being of rectangular cross section, also holds the nut against rotation.

The transmission housing 24, containing the worm and worm wheel 77 and 78 shown in Figure 15, also contains an overload clutch that will prevent damage to feed screw 23 in the event that the carriage is subjected to overload. A wooden dowel pin 136 projects from the housing 24 to receive the end face of the carriage leg 22a thereagainst in the event that the carriage is moved too far toward the housing 24 and continued driving of the assembly will only result in a slippage of the overload clutch so that the screw 23 will cease to rotate. In addition a block 137 can be mounted on the outer end of the carriage leg 22a as shown in Figure 7 to receive a second wooden pin 138 thereagainst carried by a block 139 on the ring 19. The block 137 will strike against the pin 138 in the event that the carriage is moved to the end of its radially outward stroke and continual driving will only result in the slippage of the overload clutch. The pins 136 and 138 can be made of wood and are replaceable.

The carriage 22 has the main leg 22b carrying the tool on which the tool jaws 25 are formed and the end of this leg is bifurcated to straddle the track 21. As shown in Figure 9, the track 21 is bolted to the ring 19 by means of bolts 140 and has an integral upstanding portion 21a spaced outwardly from the face of the ring 19. The bifurcated end of the carriage leg 22b has arms 141 with reduced end portions 141a straddling the track portion 21a and providing opposed faces 142 riding on the inner and outer side walls of the track portion 21a.

In order to maintain these walls 142 in proper riding relation on the track portion 21a, clamping bolts 143 extend through the legs 141 in threaded relation with one of the legs to draw the legs together. Alongside of each clamping bolt 143 there is provided a set screw 144 for maintenance of a desired spread condition for the legs. To properly adjust the surfaces 142 on the track 21a, the screws 144 are set to maintain the legs in properly spaced apart relation and the screws 143 are then tightened to draw the rear leg against the end of the set screw 144.

From the above descriptions it will be understood that each tool carriage 22 has a base leg 22a and a main leg 22b. The base leg has a groove extending along the length thereof receiving a way or track therein. The end of the main leg is bifurcated and the bifurcated fingers thereof ride on a second track. The way and the second track are carried by the rotatable main ring of the machine. Since the tool carriage must be accurately carried on the main ring, and cannot have a loose fit relationship therewith, a first bushing strip 120 is provided to adjust the exact level of the carriage on the way. A plurality of adjusting plugs 122 are provided for this purpose and these plugs can be set so as to maintain proper parallel relationship between the feed screw for the carriage and the carriage structure. Opposed bushing strips 124 are also provided with take-up means so as to maintain a tight sliding fit of the carriage on the way.

The way is mounted on pontoons or pads which space it from the face of the main ring so that any chips or turnings released from the work by the tool cannot interfere with the free movement of the carriage. The track 21 need not be mounted on pontoons or pads, since chips or turnings do not fall on it because it is out of the path of falling chips or turnings.

Summary

The crank pin turning lathe of this invention, as will be understood from the above descriptions, includes an upstanding main rotating ring receiving the work therethrough. This ring is rotatable in a housing which is movable in axial and transverse directions relative to the work. A bearing separate from the ring housing provides a one-piece radial and thrust bearing capable of holding lubricating oil pressure. The thrust bearings extend for a full 360° around the main ring, while radial bearings are spaced segmental cylindrical arcs of about 70° on the bottom portion of the assembly. The ring is spaced from the radial bearings around its top half. Lubricant is fed into wedge-like gaps between the main ring and the radial bearings, and is actually drawn onto the bearing surfaces by centrifugal force incident with rotation of the ring.

The rotating ring and adjacent housing structure have cooperating oil seals and lubricant troughs to return lubricant for recirculation. The same lubricant used for lubricating the radial bearings also lubricates the thrust bearings. Proper thrust bearing clearance is maintained by gaskets or shims readily inserted or replaced between a ring member and the main ring to which the ring member is bolted.

The tool carriages are slidably mounted on jibs or ways and these jibs or ways are carried in spaced relation from the front face of the rotating ring on pontoons which provide spaces for chips to fall through. All bolt holes and other recesses capable of collecting chips are sealed or covered. Very accurate adjustments are provided between the slide and the carriage so that close tolerances can be maintained by the machine.

The machine is especially useful for cutting to very accurate tolerances the crank pins, cheeks, and heels of crankshafts, and since the crankshafts are stationarily mounted in the machine, very large size shafts can be acted on without danger of deflection.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a machine tool with a bed having elongated tracks thereon, a carriage mounted on said tracks for movement along the length of the bed, an upstanding ring housing slidably mounted on said carriage for movement transversely across the bed, and work supports slidably mounted on said bed on opposite sides of said ring housing, the improvements of a main ring rotatably mounted in said ring housing and having a hub adapted to receive therethrough work carried by said supports, opposed tool carriages slidably mounted on a face of the main ring, a feed screw for each tool carriage, a main ring gear secured on said main ring in said ring housing, a motor driving said main ring gear, a second ring gear rotatably mounted on said main ring in said ring housing, means driven by said second ring gear for driving said feed screw, and a differential mechanism driven by said motor to drive the second ring gear on said main ring.

2. In a lathe adapted for finish cutting the crank pins, heels and cheeks of crank shafts which includes a main bed having longitudinal tracks along the length thereof, a carriage slidably mounted on said tracks, a main ring housing slidably mounted on said carriage for movement transversely of the bed, and crank shaft supporting stanchions on said bed on opposite sides of said housing, the improvements of a main ring rotatably mounted in said housing having an aperture therethrough for surrounding a crank shaft carried by said stanchions, a slide on a face of said main ring, a track on said face of the main ring in spaced relation therefrom, an L-shaped tool carriage having a slot along the base leg thereof riding on said slide and a bifurcated end on the main leg thereof riding on said track, a device controlling the position of said tool carriage on said slide, an opposed device controlling the clearance between said tool carriage and said slide, a feed screw for shifting said tool carriage radially of said main ring on said slide and track, a first ring gear in said housing rotatably mounted on said main ring driving said feed screw, a second ring gear secured in said housing around to said main ring, a motor carried by said housing, a gear train between said motor and said second ring gear, a differential mechanism driven by said gear train for driving said rotatably mounted ring gear, said differential mechanism adapted to operate for rotating the rotatable ring gear when the main ring is rotating to drive the feed screw, and a removable bearing ring in said ring housing providing a radial bearing and a thrust bearing for said main ring.

3. In a machine tool, a housing having a centrally apertured wall and an open face, a main bearing ring removably secured in said housing to said apertured wall and projecting into said aperture, said main bearing ring having an inner peripheral wall and side walls at the end of the peripheral wall, a main ring having a hub projecting into said bearing ring and supported thereon on the inner periphery thereof, said main ring having an end face for coacting with one end wall of the main bearing, a ring member secured on the hub of the main ring having an end face thrusting against the other end face of the main bearing ring, and adjustable means for shifting said ring member on said hub of the main ring to control the thrust bearing clearance relationship between the main ring and the bearing ring.

4. In a rotary tool lathe of the type including a ring housing and a rotatable tool carriage carrying main lathe ring, the improvements of a one-piece bearing ring member in said housing having opposed circular cylindrical segments forming radial bearings for said main ring together with annular opposed side faces providing thrust bearings for said main ring, and an adjustable thrust ring on said main ring cooperating with one of the faces of the main bearing ring to regulate the thrust bearing clearance relationship between the bearing ring and main ring.

5. In a rotary tool lathe a ring housing having a peripheral wall, a centrally apertured back wall, and an open front face, a bearing ring in said housing, bolts connecting said bearing ring to said back wall of the housing around the central aperture thereof, said bearing ring having an inner peripheral wall and opposed side walls in said housing projecting radially inward from the aperture-defining wall, a main lathe ring forming a front face for said open front of the housing and having a hub projecting into the housing through said bearing ring, an adjustable ring member on said hub fitting said aperture of the housing in close-running clearance relationship therewith and providing a wall riding on a side wall of the bearing ring, seal members in sliding face to face relationship respectively carried by said back wall of the housing and by said adjustable ring, said lathe ring having a face adjacent said hub acting on the other thrust face of the bearing ring, means for introducing lubricant between the hub and the inner periphery of the bearing ring, and oil troughs in the bearing ring and in the back wall of the housing for draining oil away from said cooperating seal members.

6. In a rotary tool lathe an upstanding bearing ring, an upstanding lathe ring having a hub projecting into said bearing ring, the inner periphery of said bearing ring being spaced from said hub around the top thereof and at the central bottom portion thereof whereby said hub rides only on two localized arcuate sections of the inner periphery of the bearing ring, a pocket cut into the inner periphery of the bearing ring immediately in advance of one arcuate segment on the descending side of the hub, a second pocket cut into the inner periphery of the bearing ring in the bottom thereof immediately in advance of the second bearing segment, said pocket tapering into communication with the bearing segment, and means for pumping oil into said pocket to be drawn therefrom by the wedge-like action of the main ring hub as it rides onto the supporting bearing segment.

7. In a rotary tool lathe a bearing ring having an inner periphery and flat side walls at both terminal ends of the inner periphery, a lathe ring having a hub projecting through the inner periphery of the bearing and supported on said inner periphery, said main ring having a face at the inner end of the hub cooperating with one end face of the bearing ring, a thrust ring slidably mounted on said hub having a face cooperating with the opposed end face of the bearing, means for adjusting said thrust ring on said hub to maintain proper operating clearance relationship with said main ring, and means for forcing lubricant onto the inner periphery of said bearing to flow under pressure over said thrust faces to simultaneously lubricate the faces.

8. In a rotary tool lathe a main ring adapted for rotating around the work, a slideway on a face of the main ring, an L-shaped tool carriage having a base leg with a groove along the length thereof receiving said slideway and rideable thereon, said slideway and said groove being constructed and arranged to control the looseness of said carriage in a radial plane relative to the work, a track secured on said face of the main ring having guiding surfaces disposed in radial planes relative to the work, said tool carriage having a bifurcated end on the upstanding leg thereof riding on said track and engageable with said guiding surfaces to control the looseness of said carriage in an axial direction relative to the work without effecting the looseness of said carriage in a radial plane relative to the work, and tool-carrying jaws on said upstanding leg of the carriage between said gib and said track.

9. In a rotary tool lathe a rotatable lathe ring accommodating work therethrough, a carriage slide mounted on a base of said ring, said slide having pontoons projecting from the back face thereof in spaced opposed relation along the length thereof to hold the slide in spaced relation from the face of the ring and to provide spaces accommodating passage of chips, a track mounted on said ring in spaced parallel relation from the side, an L-shaped tool carriage having a base leg with a groove along the length thereof receiving said slide and an upstanding leg with a bifurcated end straddling said track, said base leg of the carriage having a screw rod receiving bore therein in spaced parallel relation beneath said groove, a nut secured in said bore, and a feed screw extending into said bore in threaded relation with said nut for moving said tool carriage on said way and said track.

10. In a rotary tool lathe a slide for the tool carriage thereof comprising an elongated metal bar having a front face with a dove-tailed grooved slot along the length thereof, a back face with pontoons projecting therefrom at spaced intervals along the length thereof and tapered side walls converging toward the back face, said pontoons having apertures therethrough communicating with the bottom of the slot and countersunk adjacent the bottom of the slot to accommodate screw heads, and a cover plate in said slot covering the apertures therein and providing a flush front face on the slide.

11. In a rotary tool lathe a rotatable main ring member, a tool carriage slide on a face of the main ring member in spaced relation outwardly from said face, an L-shaped tool carriage having a base leg receiving said slide, a wear strip between one edge wall of the slide and said base leg of the carriage, means for regulating the level of said wear strip, opposed wear strips between the other edge of the slide and said base leg of the carriage having tapered surfaces, devices carried by the base leg of the carriage for sliding said wear strips toward and away from each other for maintaining snug sliding relationship between the base leg of the carriage and said slide, said carriage having an upstanding leg with a bifurcated end, a track on said main ring receiving the bifurcated end in sliding straddling relation thereon, and clamping screws cooperating with the bifurcated end to draw the same into good sliding contact with the track.

12. In a rotary tool lathe, a rotating main lathe ring, a tool carriage slide carried by a face of said main ring in spaced relationship therefrom to accommodate passage of chips between the slide and the face of the main ring, a tool carriage having a slot in the back face thereof receiving said slide, a wear plate in the bottom of said slot, a bushing strip between an end wall of the slide and a side wall of the slot, tapered plugs carried by the carriage acting on said bushing strip to regulate the level thereof, said carriage having a rod-receiving recess therein, a nut removably mounted in said recess, and a screw rod carried by said ring projecting into said recess and threaded into said nut for sliding the carriage on the slide whereby said plug can maintain proper relationship of the slide and the screw rod.

13. In a machine tool, a tool carriage support, a tool carriage slide mounted on a face of said tool carriage support, a tool carriage having a longitudinal slot substantially greater in width than said slide and receiving said slide therein, a bushing between an edge of said slide and said slot and arranged to determine the transverse position of said slide in said slot, means in said carriage for adjusting the transverse position of said bushing in said slot, opposed wedge strips between the other edge of the slide and said slot, and means on said carriage for actuating said wedge strips to maintain the carriage in snug sliding relationship on said slide.

14. A rotary tool lathe including a main ring having an aperture accommodating work therethrough, a tool carriage slide on said main ring, a tool carriage track on said main ring, an L-shaped tool carriage having a base leg with a slot therein receiving said slide and an upstanding leg with an end portion receiving said track, said slide and slot being constructed and arranged to control looseness of said carriage relative to the main ring in a radial plane, said track and said end portion being constructed and arranged to control looseness of said carriage relative to the main ring in an axial direction, means for maintaining the base leg of the carriage in snug sliding relationship with said slide, and means for maintaining the bifurcated end of said carriage in snug sliding relationship with said track.

15. In a machine tool, a tool carriage support, a tool carriage way mounted on the face of said tool carriage support in spaced relation therefrom to accommodate passage of chips, a tool carriage having a dove-tailed slot substantially wider than said slide receiving said slide therein, a level-adjusting strip between one edge of the slide and said slot to position said slide transversely within said slot, a wear take-up strip between the other edge of the slide and said slot, and adjusting devices for said strips to maintain the tool carriage at a desired transverse position in said slot and under desired clearance relationship relative to said slide.

16. In a rotary tool lathe, a ring housing, a bearing ring removably carried by said housing, a main lathe ring having a hub rotatably seated in said bearing ring, said bearing ring providing a radial bearing for said main lathe ring along two spaced localized arcuate segments and providing opposed thrust bearings around the full 360° of said lathe ring, means for introducing lubricant between the hub and the bearing ring to lubricate said localized radial bearing segments and to flow around the hub for lubricating the thrust bearings completely around the hub.

17. A rotary tool lathe comprising an upstanding ring housing having an open front face and a centrally apertured back wall, a main bearing ring bolted to said back wall and extending into the aperture thereof, a main lathe ring closing the open front face of said housing and having a hub projecting through said main bearing ring, a thrust ring slidably mounted on said hub acting on said bearing ring, said thrust ring and said back wall of the housing around the aperture having close running clearance relationship, and said bearing ring having an oil groove therein adjacent the gap between the back wall of the housing and the thrust ring for draining lubricant away from the gap.

18. In a rotary tool lathe, an upstanding ring housing, an oil reservoir in the bottom of said housing, a main bearing ring carried by said housing, a main lathe ring in said housing having a hub rotatably supported in said main bearing ring, a ring gear on said main lathe ring in said housing, a gear meshed with said main ring gear for driving the lathe ring, a pump receiving lubricant from said oil reservoir, piping conveying lubricant under pressure from said pump to said main bearing ring and to said ring gear and driving gear, and said main lathe ring having troughs therein returning oil to said oil reservoir for recirculation.

19. In a rotary tool lathe, a main ring housing having an open front face, an apertured back wall, and symmetrical laterally projecting wall portions, casings carried by said laterally projecting wall portions, a main lathe ring in said ring housing closing the open face thereof, mechanism in one of said casings for driving said main lathe ring, mechanism in the other of said casings for lubricating said main lathe ring, and tool carriages slidably mounted on the face of said main lathe ring.

20. In a rotary tool lathe, a bed having elongated longitudinal tracks, a carriage slidably mounted on said tracks, a main housing slidably mounted on said carriage for transverse movement across said bed, said main housing having a central ring portion and laterally projecting casing portions, a platform carried by one of said laterally projecting casing portions, stairs depending from opposite ends of said platform, a stanchion slidably mounted on said bed, a platform carried by said stanchion, and a stair depending from said stanchion platform.

21. In a rotary tool lathe, a bed, a carriage slidable on said bed, a housing slidable on said carriage, said housing having a central ring portion with an open front face and a centrally apertured back wall, a bearing ring carried by said back wall extending into said aperture, a main lathe ring closing the front face of said ring housing and having a hub supported by said bearing ring, seals on the front of the ring housing and front of the lathe ring, additional seals on the back wall of the housing and on said hub of the lathe ring, and means for introducing lubricant into said bearing ring in said housing for facilitating rotation of the main lathe ring.

LLOYD HORNBOSTEL.

REFERENCES CITED

The following references are of record in the file of this patent:

UNITED STATES PATENTS

| Number | Name | Date |
|---|---|---|
| 1,899,010 | Brittain | Feb. 28, 1933 |
| 1,020,552 | Henry | Mar. 19, 1912 |
| 1,557,524 | Hanson | Oct. 13, 1925 |
| 2,349,597 | Nenninger | May 23, 1944 |
| 646,078 | Moll | Mar. 27, 1900 |
| 847,426 | Moll | Mar. 19, 1907 |
| 790,519 | Moll et al. | May 23, 1905 |
| 1,713,892 | Dorin | May 21, 1929 |
| 520,918 | Flather | June 5, 1894 |
| 1,248,079 | Clifton | Nov. 27, 1917 |
| 1,340,811 | Ballman | May 18, 1920 |
| 898,289 | Voorhies | Sept. 8, 1908 |
| 2,321,741 | Flowers | June 15, 1943 |
| 1,859,989 | Schlegelmilch | May 24, 1932 |

FOREIGN PATENTS

| Number | Country | Date |
|---|---|---|
| 12,810 | Austria | Aug. 10, 1903 |
| 144,363 | Switzerland | Dec. 31, 1930 |